United States Patent [19]

Umemoto et al.

[11] Patent Number: 4,505,989
[45] Date of Patent: Mar. 19, 1985

[54] PHOSPHOR AND RADIATION IMAGE STORAGE PANEL EMPLOYING THE SAME

[75] Inventors: Chiyuki Umemoto; Kenji Takahashi, both of Kaisei, Japan

[73] Assignee: Fuji Photo Film Co., Ltd., Japan

[21] Appl. No.: 535,928

[22] Filed: Sep. 26, 1983

[30] Foreign Application Priority Data

Sep. 27, 1982 [JP] Japan ................... 57-166696

[51] Int. Cl.$^3$ ............................... C09K 11/465
[52] U.S. Cl. ..................... 428/691; 252/301.4 H; 250/327.2; 250/484.1
[58] Field of Search ............. 252/301.4 H; 250/327.2, 250/484.1; 428/691

[56] References Cited

U.S. PATENT DOCUMENTS 2,409,174 10/1946 Dietz ..................... 252/301.4 H
3,203,899  8/1965 Fisher .................... 252/301.4 H
3,988,252 10/1976 Ferretti .................. 252/301.4 H
4,261,854  4/1981 Kotera et al. ............. 252/301.4 H
4,336,154  6/1982 Nishimura et al. ......... 252/301.4 H
4,394,581  7/1983 Takahashi et al. ......... 250/484.1

FOREIGN PATENT DOCUMENTS 19880 12/1980 European Pat. Off. ..... 252/301.4 H
21342  1/1981 European Pat. Off. ..... 252/301.4 H
29963  6/1981 European Pat. Off. ..... 252/301.4 H Primary Examiner—Jack Cooper
Attorney, Agent, or Firm—Gerald J. Ferguson, Jr.; Joseph J. Baker

[57] ABSTRACT

A divalent europium activated alkaline earth metal fluorohalide phosphor containing a transition metal as a coacitivator and a sodium halide, having the formula (I):

$$M^{II}FX \cdot xNaX' : yEu^{2+} : zA \qquad (I)$$

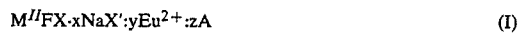

in which $M^{II}$ is at least one alkaline earth metal selected from the group consisting of Ba, Sr and Ca; each of X and X' is at least one halogen selected from the group consisting of Cl, Br and I; A is at least one transition metal selected from the group consisting of V, Cr, Mn, Fe, Co and Ni; and x, y and z are numbers satisfying the conditions of $0 < x \leq 2$, $0 < y \leq 0.2$ and $0 < z \leq 10^{-2}$, respectively, and a radiation image storage panel employing said phosphor.

4 Claims, No Drawings

PHOSPHOR AND RADIATION IMAGE STORAGE PANEL EMPLOYING THE SAME

BACKGROUND OF THE INVENTION

1. Field of the Invention

The present invention relates to a phosphor and a radiation image storage panel employing the same, and more particularly, to a divalent europium activated barium fluorohalide phosphor and a radiation image storage panel employing the same.

2. Description of the Prior Art

It has been heretofore known that a divalent europium activated barium fluorohalide phosphor absorbs a radiation such as X-rays with high efficiency. Also it has been known that the phosphor gives an emission (spontaneous emission) in the near ultraviolet region when exposed to a radiation such as X-rays, and that the maximum of the emission lies at the wavelength of about 390 nm. Recently, it has been discovered that the divalent europium activated barium fluorohalide phosphor is a stimulable phosphor. That is, when exposed to a radiation such as X-rays, the phosphor absorbs and stores a portion of the radiation energy, and emits light in the near ultraviolet region when stimulated with an electromagnetic wave within a wavelength region of 400–850 nm after exposure to the radiation. This emission is called "stimulated emission". Because of the stimulability thereof, the divalent europium activated barium fluorohalide phosphor has been paid much attention and investigated as a phosphor for a radiation image storage panel (a stimulable phosphor sheet) employable in a radiation image recording and reproducing method utilizing a stimulable phosphor.

For example, Japanese Patent Provisional Publication No. 55(1980)-12145 discloses a divalent europium activated barium fluorohalide phosphor showing a stimulated emission and a radiation image storage panel employing the same. The phosphor in the publication is expressed by the formula:

$$(Ba_{1-x}M^{II}_x)FX:yEu^{2+}$$

in which $M^{II}$ is at least one divalent metal selected from the group consisting of Mg, Ca, Sr, Zn and Cd; X is at least one element selected from the group consisting of Cl, Br and I; and x and y are numbers satisfying the conditions of $0 \leq x \leq 0.6$ and $0 \leq y \leq 0.2$, respectively.

The radiation image storage panel (stimulable phosphor sheet) employed in a radiation image recording and reproducing method described below has a basic structure comprising a support and at least one phosphor layer provided on one surface of the support. Further, a transparent film is generally provided on the free surface (surface not facing the support) of the phosphor layer to keep the phosphor layer from chemical deterioration or physical shock.

As a method replacing the conventional radiography, a radiation image recording and reproducing method utilizing a stimulable phosphor as described, for instance, in U.S. Pat. No. 4,239,968, has been recently paid much attention. The radiation image recording and reproducing method involves steps of causing a stimulable phosphor of a radiation image storage panel to absorb a radiation energy having passed through an object or having been radiated by an object; exciting the stimulable phosphor with an electromagnetic wave such as visible light and infrared rays (hereinafter referred to as "stimulating rays") to sequentially release the radiation energy stored in the stimulable phosphor as light emission; photo-electrically processing the emitted light to give an electric signal; and reproducing the electric signal as a visible image on a recording material such as a radiographic film or on a recording apparatus such as CRT.

In the above-described radiation image recording and reproducing method, a radiation image can be obtained with a sufficient amount of information by applying a radiation to the object at considerably smaller dose, as compared with the case of using the conventional radiography. Accordingly, this radiation image recording and reproducing method is of great value especially when the method is used for medical diagnosis.

In the case that the above-described method using a radiation image storage panel is employed, particularly, for carrying out the medical diagnosis, it is desired that the sensitivity of the panel to a radiation is made as high as possible to decrease the exposure dose for patient and to facilitate the procedure for converting the stimulated emission to electric signals. Accordingly, it is desired that the luminance of stimulated emission of the phosphor employed for the panel is as high as possible. That is, a measure for enhancing the luminance of the stimulated emission as highly as possible is desired for the phosphor employed in the panel. Especially when the radiation is applied to a human body as described above, the enhancement in the luminance of stimulated emission is of much value from the viewpoint of adverse effect of the radiation on the human body, even if the level of the enhancement is not so remarkable.

Japanese patent application No. 57(1982)-166320 filed by these inventors describes a radiation image recording and reproducing method using a divalent europium activated barium fluorohalide phosphor containing a sodium halide having the formula:

$$BaFX \cdot xNaX':yEu^{2+}$$

in which each of X and X' is at least one halogen selected from the group consisting of Cl, Br and I; and x and y are numbers satisfying the conditions of $0 < x \leq 2$ and $0 < y \leq 0.2$, respectively. The phosphor used in the radiation image recording and reproducing method is improved in the luminance of stimulated emission by introducing a suitable amount of sodium halide (NaX') into a divalent europium activated barium fluorohalide phosphor (BaFX:Eu$^{2+}$) which is one of divalent europium activated alkaline earth metal fluorohalide phosphors.

Further, the above-mentioned effect of the added NaX' to enhance the luminance of stimulated emission of the resulting phosphor has been confirmed in a divalent europium activated strontium fluorohalide phosphor (SrFX:Eu$^{2+}$) as well as in a divalent europium activated calcium fluorohalide phosphor (CaFX:Eu$^{2+}$). In other words, it has been confirmed that a divalent europium activated alkaline earth metal fluorohalide phosphor containing a sodium halide and having the following formula, exhibits the stimulated emission of higher luminance than a divalent europium activated alkaline earth metal fluorohalide phosphor containing no sodium halide:

$$M^{II}FX \cdot xNaX':yEu^{2+}$$

in which $M^{II}$ is at least one alkaline earth metal selected from the group consisting of Ba, Sr and Ca; each of X and X' is at least one halogen selected from the group consisting of Cl, Br and I; and x and y are numbers satisfying the conditions of $0<x\leqq2$ and $0<y\leqq0.2$, respectively.

In the aforementioned radiation image recording and reproducing method, there is a problem that the resulting image is degraded by a noise to lower the image quality when a radiation image storage panel is left for a long time or the panel is repeatedly used for a number of times. When a radiation image storage panel is left to stand for a long time, the stimulable phosphor of the panel absorbs and stores the energy of radiations such as radiations emitted from radioisotopes such as $^{226}$Ra and $^{40}$K contained in the phosphor in a very small amount and environmental radiations. Thus stored radiation energy causes the noise to lower the image quality. Otherwise, the radiation energy stored as a certain kind of latent image in the panel upon exposure to the radiation passing through an object is partly released as an emission upon stimulation but a portion of the radiation energy in certain cases remains in the panel even after the stimulation is carried out, so that the residual radiation energy causes the noise in the subsequent use of the panel. The noise particularly caused by the latter radiation energy remaining in the panel is apt to be remarkably observed on the resulting image, in the case that the exposure dose of a radiation is small in the subsequent use of the panel, that the radiation image recording and reproducing method shows a high sensitivity, or that the stimulation is carried out under the insufficient conditions such as that the intensity of the stimulating rays is low or that the wavelength of stimulating rays is not proper for the phosphor used therein.

As a method for erasing the stored radiation energy causing a noise from a radiation image storage panel, Japanese Patent Provisional Publication No. 56(1980)-11392 discloses a procedure which comprises exposing the panel to light having a wavelength within the region of stimulation wavelength of the stimulable phosphor thereof prior to exposure to a radiation such as X-rays to be absorbed. For applying said erasing method to a radiation image storage panel, it is desired that a stimulable phosphor employed in the panel has the high erasability, that is, the decay of stimulated emission thereof is as fast as possible upon stimulation with an electromagnetic wave having a wavelength within the region of stimulation wavelength thereof.

SUMMARY OF THE INVENTION

An object of the present invention is to provide a divalent europium activated alkaline earth metal fluorohalide phosphor which is improved in the erasability upon exposure to light having a wavelength within the region of stimulation wavelength thereof, as well as to provide a radiation image storage panel employing the same.

Another object of the present invention is to provide a divalent europium activated alkaline earth metal fluorohalide phosphor which exhibits stimulated emission of enhanced luminance upon stimulation with an electromagnetic wave within a wavelength region of 400-850 nm after exposure to a radiation such as X-rays, as well as to provide a radiation image storage panel employing the same.

These objects are accomplished by the phosphor and the radiation image storage panel employing the same in accordance with the present invention.

The phosphor of the invention is a divalent europium activated alkaline earth metal fluorohalide phosphor containing a transition metal as a coacitivator and a sodium halide, having the formula (I):

$$M^{II}FX \cdot xNaX' : yEu^{2+} : zA \qquad (I)$$

in which $M^{II}$ is at least one alkaline earth metal selected from the group consisting of Ba, Sr and Ca; each of X and X' is at least one halogen selected from the group consisting of Cl, Br and I; A is at least one transition metal selected from the group consisting of V, Cr, Mn, Fe, Co and Ni; and x, y and z are numbers satisfying the conditions of $0<x\leqq2$, $0<y\leqq0.2$ and $0<z\leqq10^{-2}$, respectively.

The radiation image storage panel of the invention comprises a support and at least one phosphor layer comprising a binder and a stimulable phosphor dispersed therein, in which at least one phosphor layer contains the divalent europium activated alkaline earth metal fluorohalide phosphor containing a transition metal as a coactivator and a sodium halide having the above-mentioned formula (I).

As a result of the investigations by the present inventors, it has been discovered that a divalent europium activated alkaline earth metal fluorohalide phosphor containing a sodium halide and being coactivated by an appropriate amount of the specific transition metal is improved in both the erasability and the luminance of stimulated emission. The present invention has been achieved upon the discovery. That is, the divalent europium activated alkaline earth metal fluorohalide phosphor containing a transition metal as a coactivator and a sodium halide and having the formula (I), shows the satisfactory erasability when the radiation energy stored therein is erased by exposure to light within the stimulation wavelength region thereof.

Further, when stimulated with an electromagnetic wave within a wavelength region of 400-850 nm after exposure to a radiation such as X-rays, ultraviolet rays or cathode rays, the phosphor of the present invention having the formula (I) shows stimulated emission of prominently higher luminance than that shown by a divalent europium activated alkaline earth metal fluorohalide phosphors containing a sodium halide but not containing a transition metal coactivator.

Accordingly, the radiation image storage panel of the present invention employing the phosphor having the formula (I) shows the prominent enhancement in the sensitivity as well as shows the satisfactory erasability.

DETAILED DESCRIPTION OF THE INVENTION

The divalent europium activated alkaline earth metal fluorohalide phosphor containing a transition metal as a coactivator and a sodium halide of the present invention can be prepared, for instance, by a process described below.

The phosphor can be prepared using the following materials (1) to (5):

(1) at least one alkaline earth metal fluoride selected from the group consisting of $BaF_2$, $CaF_2$ and $SrF_2$;

(2) at least one alkaline earth metal halide selected from the group consisting of $BaCl_2$, $BaBr_2$, $BaI_2$, $CaCl_2$, $CaBr_2$, $CaI_2$, $SrCl_2$, $SrBr_2$ and $SrI_2$;

(3) at least one trivalent europium compound such as europium halide, europium oxide, europium nitrate or europium sulfate;

(4) at least one transition metal compound selected from the group consisting of vanadium compounds, chromium compounds, manganese compounds, iron compounds, cobalt compounds and nickel compounds such as their halides, their oxides, their nitrates and their sulfates; and (5) at least one sodium halide selected from the group consisting of NaCl, NaBr and NaI.

In the process for the preparation of the phosphor of the invention, the above-mentioned alkaline earth metal fluoride (1), the alkaline earth metal halide (2), the europium compound (3) and the transition metal compound (4) are, in the first place, mixed in the stoichiometric ratio corresponding to the formula (II):

$$M^{II}FX:yEu:zA \qquad (II)$$

in which $M^{II}$, X, A, x and y have the same meanings as defined hereinbefore.

The mixing procedure is generally carried out in the form of a suspension using distilled water. The distilled water contained in the suspension is then removed to obtain a dry cake. The removal of the distilled water is preferably carried out at room temperature or not so high temperature (for example, not higher than 200° C.) under reduced pressure, or under vacuum, otherwise a combination of under reduced pressure and subsequent under vacuum. The obtained dry mixture is pulverized finely by means of a mortar or the like. To the pulverized mixture is added the abovementioned sodium halide (5) in an amount of x mol (x is a number satisfying the condition of $0 < x \leq 2$) for 1 gram atom of an alkaline earth metal contained in the mixture, and these are then mixed well to obtain a mixture of the starting materials for the phosphor.

Otherwise, the transition metal compound (4) may be added to the pulverized mixture together with sodium halide (5), instead of introducing into the suspension.

Then, the mixture of the starting materials for the phosphor is placed in a heat-resistant container such as a quartz boat, an alumina crucible or a quartz crucible, and fired in an electric furnace. The temperature for the firing suitably ranges from 600° to 1000° C. The firing period is determined depending upon the amount of the mixture of the starting materials charged into the heat-resistant container, the firing temperature, etc., and generally ranges from 0.5 to 12 hours. As the firing atmosphere, there can be employed a weak reducing atmosphere such as a nitrogen gas atmosphere containing a small amount of hydrogen gas or a carbon dioxide gas atmosphere containing carbon monoxide gas. In the firing stage, the trivalent europium contained in the mixture is reduced into divalent europium by the weak reducing atmosphere.

The product obtained by firing conducted under the above-mentioned conditions is taken out of the furnace, allowed to stand for cooling, and pulverized. The pulverized product may be again placed in the heat-resistant container and fired in the electric furnace. In the second firing, the temperature of the firing suitably ranges from 500° to 800° C. and the firing period suitably ranges from 0.5 to 12 hours. For carrying out the second firing, there can be employed an inert atmosphere such as a nitrogen gas atmosphere or an argon gas atmosphere, as well as the above-mentioned weak reducing atmosphere.

After the firing is complete, the fired product is finely pulverized to obtain a powdery phosphor of the invention. The powdery phosphor thus obtained may be processed in a conventional manner involving a variety of procedures for the preparation of phosphors such as a washing procedure, a drying procedure and a sieving procedure.

The phosphor of prepared in accordance with the above-mentioned process is a divalent europium activated alkaline earth metal fluorohalide phosphor containing therein a transition metal as a coactivator and a sodium halide, having the formula (I):

$$M^{II}FX \cdot xNaX':yEu^{2+}:zA \qquad (I)$$

in which $M^{II}$ is at least one alkaline earth metal selected from the group consisting of Ba, Sr and Ca; each of X and X' is at least one halogen selected from the group consisting of Cl, Br and I; A is at least one transition metal selected from the group consisting of V, Cr, Mn, Fe, Co and Ni; and x, y and z are numbers satisfying the conditions of $0 < x \leq 2$, $0 < y \leq 0.2$ and $0 < z \leq 10^{-2}$, respectively. The transition metal expressed by A in the formula (I) is contained in a divalent and/or trivalent ionic state in the phosphor.

In the phosphor of the invention having the formula (I), A is preferably at least one transition metal selected from the group consisting of Cr, V and Mn from the viewpoints of improvement in the erasability and of enhancement in the emission luminance upon stimulation with an electromagnetic wave within the wavelength region of 400–850 nm. From the same viewpoints, y and z preferably are numbers satisfying the conditions of $10^{-5} \leq y \leq 10^{-1}$ and $10^{-6} \leq z \leq 10^{-3}$, respectively.

The phosphor of the present invention, as described above, is improved in the erasability upon exposure to light having a wavelength within a region of the stimulation wavelength thereof. Further, the phosphor of the present invention exhibits emission of enhanced luminance upon stimulation with an electromagnetic wave within a wavelength region of 400–850 nm after exposure to a radiation such as X-rays, as compared with a divalent europium activated alkaline earth metal fluorohalide phosphor containing simply a sodium halide. Accordingly, the phosphor of the invention is particularly suitable to be employed in a radiation image storage panel.

The radiation image storage panel of the present invention substantially comprises a support and at least one phosphor layer provided thereon, and at least one phosphor layer contains the aforementioned divalent europium activated alkaline earth metal fluorohalide phosphor containing a transition metal as a coactivator and a sodium halide.

The support material employed in the present invention can be chosen from those employed in the conventional radiogaphic intensifying screens. Examples of the support material include plastic films such as films of cellulose acetate, polyester, polyethylene terephthalate, polyamide, polyimide, triacetate and polycarbonate; metal sheets such as aluminum foil and aluminum alloy foil; ordinary papers; baryta paper; resin-coated papers; pigment papers containing titanium dioxide or the like; and papers sized with polyvinyl alcohol or the like. From a viewpoint of characteristics of a radiation image storage panel as an information recording material, a plastic film is preferably employed as the support material of the invention. The plastic film may contain a light-absorbing material such as carbon black, or may contain a light-reflecting material such as titanium dioxide. The former is appropriate for preparing a high sharpness type radiation image storage panel, while the latter is appropriate for preparing a high sensitive type radiation image storage panel.

In the preparation of a known radiation image storage panel, one or more additional layers are occasionally provided between the support and the phosphor layer to enhance the adhesion between the support and the phosphor layer, or to improve the sensitivity of the panel or the quality of the image (sharpness and graininess) provided thereby. For instance, a subbing layer or an adhesive layer may be provided by coating a polymer material such as gelatin over the surface of the support on the phosphor layer side. Otherwise, a light-reflecting layer or a light-absorbing layer may be provided by providing a polymer material layer containing a light-reflecting material such as titanium dioxide or a light-absorbing material such as carbon black. In the present invention, one or more of these additional layers may be provided depending on the type of the radiation image storage panel under preparation.

As described in Japanese Patent Application No. 57(1982)-82431 filed by the assignee of the present application, the phosphor layer side surface of the support (or the surface of an adhesive layer, light-reflecting layer, or light-absorbing layer in the case where such layers provided on the support) may be provided with protruded and depressed portions for enhancement of the sharpness of the image obtained.

A phosphor layer can be formed on the support, for instance, by the following procedure.

In the first place, the aforementioned phosphor particles and a binder are added to an appropriate solvent, and these are then mixed to prepare a coating dispersion of the phosphor particles in the binder solution.

Examples of the binder to be comprised in the phosphor layer include: natural polymers such as proteins (e.g. gelatin), polysaccharides (e.g. dextran) and gum arabic; and synthetic polymers such as polyvinyl butyral, polyvinyl acetate, nitrocellulose, ethylcellulose, vinylidene chloride-vinyl chloride copolymer, polymethyl methacrylate, vinyl chloride-vinyl acetate copolymer, polyurethane, cellulose acetate butyrate, polyvinyl alcohol, and linear polyester. Particularly preferred are nitrocellulose, linear polyester, and a mixture of nitrocellulose and linear polyester.

Examples of the solvent employable in the preparation of the coating dispersion include lower alcohols such as methanol, ethanol, n-propanol and n-butanol; chlorinated hydrocarbons such as methylene chloride and ethylene chloride; ketones such as acetone, methyl ethyl ketone and methyl isobutyl ketone; esters of lower alcohols with lower aliphatic acids, such as methyl acetate, ethyl acetate and butyl acetate; ethers such as dioxane, ethylene glycol monoethylether and ethylene glycol monoethyl ether; and mixtures of the above-mentioned compounds.

The ratio between the binder and the phosphor in the coating dispersion may be determined according to the characteristics of the aimed radiation image storage panel and the nature of the phosphor employed. Generally, the ratio therebetween is within the range of from 1:1 to 1:100 (binder:phosphor, by weight), preferably from 1:8 to 1:40.

The coating dispersion may contain a dispersing agent to assist the dispersibility of the phosphor particles therein, and also contain a variety of additives such as a plasticizer for increasing the bonding between the binder and the phosphor particles in the phosphor layer. Examples of the dispersing agent include phthalic acid, stearic acid, caproic acid and a hydrophobic surface active agent. Examples of the plasticizer include phosphates such as triphenyl phosphate, tricresyl phosphate and diphenyl phosphate; phthalates such as diethyl phthalate and dimethoxyethyl phthalate; glycolates such as ethylphthalyl ethyl glycolate and butylphthalyl butyl glycolate; and polyesters of polyethylene glycols with aliphatic dicarboxylic acids such as polyester of triethylene glycol with adipic acid and polyester of diethylene glycol with succinic acid.

The coating dispersion containing the phosphor particles and the binder prepared as above described is applied evenly onto the surface of the support to form a layer of the coating dispersion. The coating procedure can be carried out by a conventional method such as a method using a doctor blade, a roll coater or a knife coater.

After applying the coating dispersion to the support, the coating dispersion is then heated slowly to dryness so as to complete the formation of a phosphor layer. The thickness of the phosphor layer varies depending upon the characteristics of the aimed radiation image storage panel, the nature of the phosphor, the ratio between the binder and the phosphor, etc. Generally, the thickness of the phosphor layer is within the range of from 20 $\mu$m to 1 mm, preferably from 50 to 500 $\mu$m.

The phosphor layer can be provided on the support by the methods other than that given in the above. For instance, the phosphor layer is initially prepared on a sheet (false support) such as a glass plate, a metal plate or a plastic sheet using the aforementioned coating dispersion and then thus prepared phosphor layer is overlaid on the genuine support under pressure or using an adhesive agent.

The phosphor layer placed on the support can be in the form of a single layer or in the form of plural (two or more) layers. If the plural phosphor layers are placed, at least one phosphor layer contains the aforementioned divalent europium activated alkaline earth metal fluorohalide phosphor containing a transition metal as a coactivator and a sodium halide of the invention. The plural layers can be placed in such a manner that a layer nearer to the surface shows stimulated emission of higher luminance.

In both the single and plural phosphor layers, a variety of known stimulable phosphors are employable in combination with the phosphor of the invention.

Examples of the stimulable phosphor employable in the radiation image storage panel of the present invention include:

SrS:Ce,Sm, SrS:Eu,Sm, ThO$_2$:Er, and La$_2$O$_2$S:Eu,Sm, as described in U.S. Pat. No. 3,859,527;

ZnS:Cu,Pb, BaO.xAl$_2$O$_3$:Eu, in which x is a number satisfying the condition of $0.8 \leq x \leq 10$, and M$^{2+}$O.xSiO$_2$:A, in which M$^{2+}$ is at least one divalent metal selected from the group consisting of Mg, Ca, Sr, Zn, Cd and Ba, A is at least one element selected from the group consisting of Ce, Tb, Eu, Tm, Pb, Tl, Bi and Mn, and x is a number satisfying the condition of $0.5 \leq x \leq 2.5$, as described in U.S. Pat. No. 4,326,078;

$(Ba_{1-x-y},Mg_x,Ca_y)FX:aEu^{2+}$, in which X is at least one element selected from the group consisting of Cl and Br, x and y are numbers satisfying the conditions of $0 < x+y \leq 0.6$, and $xy \neq 0$, and a is a number satisfying the condition of $10^{-6} \leq a \leq 5 \times 10^{-2}$, as described in Japanese Patent Provisional Publication No. 55(1980)-12143;

LnOX:xA, in which Ln is at least one element selected from the group consisting of La, Y, Gd and Lu, X is at least one element selected from the group consisting of Cl and Br, A is at least one element selected from the group consisting of Ce and Tb, and x is a number satisfying the condition of $0 < x < 0.1$, as described in the above-mentioned U.S. Pat. No. 4,236,078;

$(Ba_{1-x},M^{II}_x)FX:yA$, in which $M^{II}$ is at least one divalent metal selected from the group consisting of Mg, Ca, Sr, Zn and Cd, X is at least one element selected from the group consisting of Cl, Br and I, A is at least one element selected from the group consisting of Eu, Tb, Ce, Tm, Dy, Pr, Ho, Nd, Yb and Er, and x and y are numbers satisfying the conditions of $0 \leq x \leq 0.6$ and $0 \leq y \leq 0.2$, respectively, as described in Japanese Patent Provisional Publication No. 55(1980)-12145; and $BaFX \cdot xNaX':yEu^{2+}$, in which each of X and X' is at least one halogen selected from the group consisting of Cl, Br and I; and x and y are numbers satisfying the conditions of $0 < x \leq 2$ and $0 \leq y \leq 0.2$, respectively, as described in the aforementioned Japanese Patent Application No. 57(1982)-166320.

A radiation image storage panel generally has a transparent film on a free surface of a phosphor layer to protect the phosphor layer from physical and chemical deterioration. In the panel of the present invention, it is preferable to provide a transparent film for the same purpose.

The transparent film can be provided onto the phosphor layer by coating the surface of the phosphor layer with a solution of a transparent polymer such as a cellulose derivative (e.g. cellulose acetate or nitro-cellulose), or a synthetic polymer (e.g. polymethyl methacrylate, polyvinyl butyral, polyvinyl formal, polycarbonate, polyvinyl acetate, or vinyl chloride-vinyl acetate copolymer), and drying the coated solution. Alternatively, the transparent film can be provided onto the phosphor layer by beforehand preparing it from a polymer such as polyethylene terephthalate, polyethylene, polyvinylidene chloride or polyamide, followed by placing and fixing it onto the phosphor layer with an appropriate adhesive agent. The transparent protective film preferably has a thickness within a range of approximately 3 to 20 μm.

The following examples will further describe the present invention, but these examples by no means restrict the invention.

EXAMPLE 1

To 500 cc. of distilled water ($H_2O$) were added 175.34 g. of barium fluoride ($BaF_2$), 331.51 g. of barium bromide ($BaBr_2 \cdot 2H_2O$) and 0.783 g. of europium bromide ($EuBr_3$), and they were mixed to obtain a suspension. The suspension was dried at 60° C. under reduced pressure for 3 hours and further dried at 150° C. under vacuum for another 3 hours. After the dried product being pulverized, 58.3 mg. of chromium bromide ($CrBr_3$) and 0.660 g. of sodium bromide (NaBr) were added to the pulverized product, and they were mixed to obtain a homogeneous mixture of the starting materials for a phosphor.

The mixture thus obtained was placed in an alumina crucible, which was, in turn, placed in a high-temperature electric furnace. The mixture was then fired at 900° C. for 1.5 hours under a carbon dioxide atmosphere containing carbon monoxide. After the firing was complete, the crucible was taken out of the furnace and allowed to stand for cooling. The fired product was pulverized, placed in the alumina crucible again, and then fired at 600° C. for 1 hour under a nitrogen gas atmosphere (second firing). After the second firing was complete, the fired product was allowed to stand for cooling and pulverized finely to obtain a powdery divalent europium activated barium fluorobromide phosphor containing Cr coactivator and NaBr ($BaFBr \cdot 3.2 \times 10^{-3}NaBr:0.001Eu^{2+}:10^{-4}Cr$).

To a mixture of the obtained phosphor particles and a linear polyester resin were added successively methyl ethyl ketone and nitrocellulose (nitrofication degree: 11.5%), to prepare a dispersion containing the phosphor and the binder (20:1, by weight). Subsequently, tricresyl phosphate, n-butanol and methyl ethyl ketone were added to the dispersion. The mixture was sufficiently stirred by means of a propeller agitater to obtain a homogeneous coating dispersion having a viscosity of 25-35 PS (at 25° C.).

The coating dispersion was applied to a polyethylene terephthalate sheet containing carbon black (support, thickness: 250 μm) placed horizontally on a glass plate. The application of the coating dispersion was carried out using a doctor blade. The support having a layer of the coating dispersion was then placed in an oven and heated at a temperature gradually rising from 25° to 100° C. Thus, a phosphor layer having thickness of 200 μm was formed on the support.

On the phosphor layer was placed a transparent polyethylene terephthalate film (thickness: 12 μm; provided with a polyester adhesive layer on one surface) to combine the transparent film and the phosphor layer with the adhesive layer.

Thus, a radiation image storage panel consisting essentially of a support, a phosphor layer and a transparent protective film was prepared.

EXAMPLE 2

The same amounts of barium fluoride, barium bromide, europium bromide and distilled water as employed in Example 1 were mixed to prepare a suspension. The suspension was dried and pulverized in the same manner as described in Example 1. To the pulverized product were then added 5.83 mg. of chromium bromide ($CrBr_3$) and 0.660 g. of sodium bromide (NaBr), and they were mixed to obtain a homogeneous mixture of the starting materials for a phosphor.

The procedure of Example 1 was repeated except for using the prepared mixture to obtain a powdery divalent europium activated barium fluorobromide phosphor containing Cr coactivator and NaBr ($BaFBr \cdot 3.2 \times 10^{-3}NaBr:0.001Eu^{2+}:10^{-5}Cr$).

A radiation image storage panel consisting essentially of a support, a phosphor layer and a transparent protective film was prepared in the same manner as described in Example 1 except for using the phosphor as obtained above.

EXAMPLE 3

The same amounts of the barium fluoride, barium bromide, europium bromide and distilled water as employed in Example 1 were mixed to prepare a suspension. The suspension was dried and pulverized in the same manner as described in Example 1. To the pulverized product were then added 0.583 mg. of chromium bromide ($CrBr_3$) and 0.660 g. of sodium bromide (NaBr), and they were mixed to obtain a homogeneous mixture of the starting materials for a phosphor.

The procedure of Example 1 was repeated except for using the prepared mixture to obtain a powdery divalent europium activated barium fluorobromide phosphor containing Cr coactivator and NaBr ($BaFBr.3.2 \times 10^{-3}NaBr:0.001Eu^{2+}:10^{-6}Cr$).

A radiation image storage panel consisting essentially of a support, a phosphor layer and a transparent protective film was prepared in the same manner as described in Example 1 except for using the phosphor as obtained above.

COMPARISON EXAMPLE 1

The same amounts of barium fluoride, barium bromide, europium bromide and distilled water as employed in Example 1 were mixed to prepare a suspension. The suspension was dried and pulverized in the same manner as described in Example 1. To the pulverized product was then added only 0.660 g. of sodium bromide (NaBr) and they were mixed to obtain a homogeneous mixture of the starting materials for a phosphor.

The procedure of Example 1 was repeated except for using the prepared mixture to obtain a powdery divalent europium activated barium fluorobromide phosphor containing NaBr ($BaFBr.3.2 \times 10^{-3}NaBr:0.001Eu^{2+}$).

A radiation image storage panel consisting essentially of a support, a phosphor layer and a transparent protective film was prepared in the same manner as described in Example 1 except for using the phosphor as obtained above.

The phosphors and radiation image storage panels prepared in Examples 1 through 3 and Comparison Example 1 were evaluated on the luminance of stimulated emission (sensitivity) and the erasability. The evaluation methods are given below:

(1) Luminance of stimulated emission (Sensitivity)

The phosphor or radiation image storage panel was stimulated with an He-Ne laser (oscillation wavelength: 632.8 nm) after exposure to X-rays at 80 KVp, to measure the luminance of stimulated emission of the phosphor or the sensitivity of the panel, respectively.

(2) Erasability

The phosphor or radiation image storage panel was measured on the decay curve of the stimulated emission thereof under stimulation with an He-Ne laser (oscillation wavelength: 632.8 nm) after exposure to X-rays at 80 KVp. The erasing time within which the luminance of the stimulated emission was decayed to 1/1000 of the initial value thereof was determined.

The results on the evaluation of the phosphors are set forth in Table 1.

TABLE 1

| | Content of Cr Coactivator | Relative Luminance | Relative Erasing time |
| --- | --- | --- | --- |
| Example 1 | $10^{-4}$ | 140 | 71 |
| 2 | $10^{-5}$ | 160 | 86 |
| 3 | $10^{-6}$ | 148 | 71 |
| Com. Example 1 | 0 | 100 | 100 |

The results on the evaluation of the radiation image storage panels were almost same as the above-mentioned results.

EXAMPLE 4

The same amounts of barium fluoride, barium bromide, europium bromide and distilled water as employed in Example 1 were mixed to prepare a suspension. The suspension was dried and pulverized in the same manner as described in Example 1. To the pulverized product were then added 58.1 mg. of vanadium bromide ($VBr_3$) and 0.660 g. of sodium bromide (NaBr), and they were mixed to obtain a homogeneous mixture of the starting materials for a phosphor.

The procedure of Example 1 was repeated except for using the prepared mixture to obtain a powdery divalent europium activated barium fluorobromide phosphor containing V coactivator and NaBr ($BaFBr.3.2 \times 10^{-3}NaBr:0.001Eu^{2+}:10^{-4}V$).

A radiation image storage panel consisting essentially of a support, a phosphor layer and a transparent protective film was prepared in the same manner as described in Example 1 except for using the phosphor as obtained above.

EXAMPLE 5

The same amounts of barium fluoride, barium bromide, europium bromide and distilled water as employed in Example 1 were mixed to prepare a suspension. The suspension was dried and pulverized in the same manner as described in Example 1. To the pulverized product were then added 5.81 mg. of vanadium bromide ($VBr_3$) and 0.660 g. of sodium bromide (NaBr), and they were mixed to obtain a homogeneous mixture of the starting materials for a phosphor.

The procedure of Example 1 was repeated except for using the prepared mixture to obtain a powdery divalent europium activated barium fluorobromide phosphor containing V coactivator and NaBr ($BaFBr.3.2 \times 10^{-3}NaBr:0.001Eu^{2+}:10^{-5}V$).

A radiation image storage panel consisting essentially of a support, a phosphor layer and a transparent protective film was prepared in the same manner as described in Example 1 except for using the phosphor as obtained above.

EXAMPLE 6

The same amounts of barium fluoride, barium bromide, europium bromide and distilled water as employed in Example 1 were mixed to prepare a suspension. The suspension was dried and pulverized in the same manner as described in Example 1. To the pulverized product were then added 0.581 mg. of vanadium bromide ($VBr_3$) and 0.660 g. of sodium bromide (NaBr), and they were mixed to obtain a homogeneous mixture of the starting materials for a phosphor.

The procedure of Example 1 was repeated except for using the prepared mixture to obtain a powdery divalent europium activated barium fluorobromide phosphor containing V coactivator and NaBr ($BaFBr.3.2 \times 10^{-3}NaBr:0.001Eu^{2+}:10^{-6}V$).

A radiation image storage panel consisting essentially of a support, a phosphor layer and a transparent protective films was prepared in the same manner as described in Example 1 except for using the phosphor as obtained above.

The phosphor and radiation image storage panels prepared in Examples 4 through 6 were evaluated on the luminance of stimulated emission (sensitivity) and the erasability in the manner as described above.

The results on the evaluation of the phosphors are set forth in Table 2. The aforementioned result on the phosphor prepared in Comparison Example 1 is also set forth in Table 2.

TABLE 2

|  | Content of V Coactivator | Relative Luminance | Relative Erasing time |
| --- | --- | --- | --- |
| Example 4 | $10^{-4}$ | 160 | 84 |
| 5 | $10^{-5}$ | 166 | 91 |
| 6 | $10^{-6}$ | 137 | 82 |
| Com. Example 1 | 0 | 100 | 100 |

The results on the evaluation of the radiation image storage panels were almost same as the above-mentioned results.

EXAMPLE 7

The same amounts of barium fluoride, barium bromide, europium bromide and distilled water as employed in Example 1 were mixed to prepare a suspension. The suspension was dried and pulverized in the same manner as described in Example 1. To the pulverized product were then added 43.0 mg. of manganese bromide ($MnBr_2$) and 0.660 g. of sodium bromide (NaBr), and they were mixed to obtain a homogeneous mixture of the starting materials for a phosphor.

The procedure of Example 1 was repeated except for using the prepared mixture to obtain a powdery divalent europium activated barium fluorobromide phosphor containing Mn coactivator and NaBr ($BaFBr.3.2\times10^{-3}NaBr:0.001Eu^{2+}:10^{-4}Mn$).

A radiation image storage panel consisting essentially of a support, a phosphor layer and a transparent protective film was prepared in the same manner as described in Example 1 except for using the phosphor as obtained above.

EXAMPLE 8

The same amounts of barium fluoride, barium bromide, europium bromide and distilled water as employed in Example 1 were mixed to prepare a suspension. The suspension was dried and pulverized in the same manner as described in Example 1. To the pulverized product were then added 4.30 mg. of manganese bromide ($MnBr_2$) and 0.660 g. of sodium bromide (NaBr), and they were mixed to obtain a homogeneous mixture of the starting materials for a phosphor.

The procedure of Example 1 was repeated except for using the prepared mixture to obtain a powdery divalent europium activated barium fluorobromide phosphor containing Mn coactivator and NaBr ($BaFBr.3.2\times10^{-3}NaBr:0.001Eu^{2+}:10^{-5}Mn$).

A radiation image storage panel consisting essentially of a support, a phosphor layer and a transparent protective film was prepared in the same manner as described in Example 1 except for using the phosphor as obtained above.

EXAMPLE 9

The same amounts of barium fluoride, barium bromide, europium bromide and distilled water as employed in Example 1 were mixed to prepare a suspension. The suspension was dried and pulverized in the same manner as described in Example 1. To the pulverized product were then added 0.430 mg. of manganese bromide ($MnBr_2$) and 0.660 g. of sodium bromide (NaBr), and they were mixed to obtain a homogeneous mixture of the starting materials for a phosphor.

The procedure of Example 1 was repeated except for using the prepared mixture to obtain a powdery divalent europium activated barium fluorobromide phosphor containing Ma coactivator and NaBr ($BaFBr.3.2\times10^{-3}NaBr:0.001Eu^{2+}:10^{-6}Mn$).

A radiation image storage panel consisting essentially of a support, a phosphor layer and a transparent protective film was prepared in the same manner as described in Example 1 except for using the phosphor as obtained above.

The phosphor and radiation image storage panels prepared in Examples 7 through 9 were evaluated on the luminance of stimulated emission (sensitivity) and the erasability in the manner as described above.

The results on the evaluation of the phosphors are set forth in Table 3. The aforementioned result on the phosphor prepared in Comparison Example 1 is also set forth in Table 3.

TABLE 3

|  | Content of Mn Coactivator | Relative Luminance | Relative Erasing time |
| --- | --- | --- | --- |
| Example 7 | $10^{-4}$ | 109 | 98 |
| 8 | $10^{-5}$ | 124 | 99 |
| 9 | $10^{-6}$ | 151 | 86 |
| Com. Example 1 | 0 | 100 | 100 |

The results on the evaluation of the radiation image storage panels were almost same as the above-mentioned results.

EXAMPLE 10

The same amounts of barium fluoride, barium bromide, europium bromide and distilled water as employed in Example 1 were mixed to prepare a suspension. The suspension was dried and pulverized in the same manner as described in Example 1. To the pulverized product were then added 43.8 mg. of cobalt bromide ($CoBr_2$) and 0.660 g. of sodium bromide (NaBr), and they were mixed to obtain a homogeneous mixture of the starting materials for a phosphor.

The procedure of Example 1 was repeated except for using the prepared mixture to obtain a powdery divalent europium activated barium fluorobromide phosphor containing Co coactivator and NaBr ($BaFBr.3.2\times10^{-3}NaBr:0.001Eu^{2+}:10^{-4}Co$).

A radiation image storage panel consisting essentially of a support, a phosphor layer and a transparent protective film was prepared in the same manner as described in Example 1 except for using the phosphor as obtained above.

The phosphor and radiation image storage panel prepared in Example 10 were evaluated on the luminance of stimulated emission (sensitivity) and the erasability in the same manner as described above.

The result on the evaluation of the phosphor is set forth in Table 4. The aforementioned result on the phosphor prepared in Comparison Example 1 is also set forth in Table 4.

TABLE 4

|  | Content of Co Coactivator | Relative Luminance | Relative Erasing time |
| --- | --- | --- | --- |
| Example 10 | $10^{-4}$ | 126 | 95 |
| Com. Example 1 | 0 | 100 | 100 |

The result on the evaluation of the radiation image storage panel was almost same as the above-mentioned result.

EXAMPLE 11

The same amounts of barium fluoride, barium bromide, europium bromide and distilled water as employed in Example 1 were mixed to prepare a suspension. The suspension was dried and pulverized in the same manner as described in Example 1. To the pulverized product were then added 0.437 mg. of nickel bromide ($NiBr_2$) and 0.660 g. of sodium bromide (NaBr), and they were mixed to obtain a homogeneous mixture of the starting materials for a phosphor.

The procedure of Example 1 were repeated except for using the prepared mixture to obtain a powdery divalent europium activated barium fluorobromide phosphor containing Ni coactivator and NaBr ($BaFBr.3.2\times10^{-3}NaBr:0.001Eu^{2+}:10^{-6}Ni$)

A radiation image storage panel consisting essentially of a support, a phosphor layer and a transparent protective film was prepared in the same manner as described in Example 1 except for using the phosphor as obtained above.

The phosphor and radiation image storage panel prepared in Example 11 were evaluated on the luminance of stimulated emission (sensitivity) and the erasability in the manner as described above.

The result on the evaluation of the phosphor is set forth in Table 5. The aforementioned result on the phosphor prepared on Comparison Example 1 is also set forth in Table 5.

TABLE 5

| | Content of Ni Coactivator | Relative Luminance | Relative Erasing time |
|---|---|---|---|
| Example 11 | $10^{-6}$ | 109 | 99 |
| Com. Example 1 | 0 | 100 | 100 |

The result on the evaluation of the radiation image storage panel was almost same as the above-mentioned result.

EXAMPLE 12

The same amounts of barium fluoride, barium bromide, europium bromide and distilled water as employed in Example 1 were mixed to prepare a suspension. The suspension was dried and pulverized in the same manner as described in Example 1. To the pulverized product were then added 0.591 mg. of iron bromide ($FeBr_3$) and 0.660 g. of sodium bromide (NaBr), and they were mixed to obtain a homogeneous mixture of the starting materials for a phosphor.

The procedure of Example 1 was repeated except for using the prepared mixture to obtain a powdery divalent europium activated barium fluorobromide phosphor containing Fe coactivator and NaBr ($BaFBr.3.2\times10^{-3}NaBr:0.001Eu^{2+}:10^{-6}Fe$).

A radiation image storage panel consisting essentially of a support, a phosphor layer and a transparent protective film was prepared in the same manner as described in Example 1 except for using the phosphor as obtained above.

The phosphor and radiation image storage panel prepared in Example 12 were evaluated on the luminance of stimulated emission (sensitivity) and the erasability in the manner as described above.

The result on the evaluation of the phosphor is set forth in Table 6. The aforementioned result on the phosphor prepared in Comparison Example 1 is also set forth in Table 6.

TABLE 6

| | Content of Fe Coactivator | Relative Luminance | Relative Erasing time |
|---|---|---|---|
| Example 12 | $10^{-6}$ | 100 | 95 |
| Com. Example 1 | 0 | 100 | 100 |

The result on the evaluation of the radiation image storage panel was almost same as the above-mentioned result.

We claim:

1. A divalent europium activated alkaline earth metal fluorohalide phosphor containing a transition metal as a coactivator and a sodium halide, having the formula (I):

$$M^{II}FX.xNaX':yEu^{2+}:zA \qquad (I)$$

in which $M^{II}$ is at least one alkaline earth metal selected from the group consisting of Ba, Sr and Ca; each of X and X' is at least one halogen selected from the group consisting of Cl, Br I; A is at least one transition metal selected from the group consisting of V, Cr, Mn, Fe, Co and Ni; and x, y and z are numbers satisfying the conditions of $0<x\leq2$, $0<y\leq0.2$ and $0<z\leq10^{-2}$, respectively, and exhibiting a higher luminance and/or a lower erasing time than said phosphor absent A when it is exposed to x-rays and is subsequently stimulated with an electromagnetic wave within a wavelength region of 400–850 nm.

2. The phosphor as claimed in claim 1, in which y and z in the formula (I) are numbers satisfying the conditions of $10^{-5}\leq y\leq10^{-1}$ and $10^{-6}\leq z\leq10^{-3}$, respectively.

3. The phosphor as claimed in claim 1 or claim 2, in which A in the formula (I) is at least one transition metal selected from the group consisting of V, Cr and Mn.

4. A radiation storage panel comprising a support and at least one phosphor layer provided thereon which comprises a binder and a stimulable phosphor dispersed therein, in which at least one phosphor layer contains a divalent europium activated alkaline earth metal fluorohalide phosphor containing a transition metal as a coactivator and a sodium halide, having the formula (I):

$$M^{II}FX.xNaX':yEu^{2+}:zA \qquad (I)$$

in which $M^{II}$ is at least one alkaline earth metal selected from the group consisting of Ba, Sr and Ca; each of X and X' is at least one halogen selected from the group consisting of Cl, Br and I; A is at least one transition metal selected from the group consisting of V, Cr, Mn, Fe, Co and Ni; and x, y and z are numbers satisfying the conditions of $0<x\leq2$, $0<y\leq0.2$ and $0<z\leq10^{-2}$, respectively, and wherein the fluorohalide phosphor exhibits a higher luminance and/or lower erasing time than said fluorohalide phosphor absent A when it is exposed to x-rays and is subsequently stimulated with an electromagnetic wave within a wavelength region of 400–850 nm.

* * * * *